US012789708B2

(12) United States Patent
Gare et al.

(10) Patent No.: US 12,789,708 B2
(45) Date of Patent: Nov. 10, 2026

(54) MODULE FOR FRUNK OF VEHICLE

(71) Applicant: SUBARU CORPORATION, Tokyo (JP)

(72) Inventors: Logan Gare, VanBuren Township, MI (US); Yusaku Dogahira, VanBuren Township, MI (US); Praharsha Gurram, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 258 days.

(21) Appl. No.: 18/674,354

(22) Filed: May 24, 2024

(65) Prior Publication Data

US 2025/0360878 A1 Nov. 27, 2025

(51) Int. Cl.
*B60R 5/02* (2006.01)
*B60N 3/00* (2006.01)

(52) U.S. Cl.
CPC ................ *B60R 5/02* (2013.01); *B60N 3/001* (2013.01)

(58) Field of Classification Search
CPC .................................. B60R 5/02; B60N 3/001
See application file for complete search history.

(56) References Cited

U.S. PATENT DOCUMENTS

| | | | | |
|---|---|---|---|---|
| 11,220,301 | B2 | 1/2022 | Robinson et al. | |
| 2023/0255349 | A1 | 8/2023 | Salerno et al. | |
| 2023/0398939 | A1 * | 12/2023 | Hannan | B60R 5/02 |

FOREIGN PATENT DOCUMENTS

| | | | | |
|---|---|---|---|---|
| DE | 102017011984 | A1 * | 6/2019 | B60R 5/02 |
| DE | 202019105898 | U1 * | 11/2019 | B62D 25/105 |
| JP | S58108970 | U | 7/1983 | |

* cited by examiner

*Primary Examiner* — Nicholas McFall
*Assistant Examiner* — Eric Acosta
(74) *Attorney, Agent, or Firm* — Rimon P.C.

(57) ABSTRACT

A module for a frunk of a vehicle is expandable or unfoldable toward an outside of the vehicle when in use.

11 Claims, 2 Drawing Sheets

MODULE FOR FRUNK OF VEHICLE

FIELD OF INVENTION

The present disclosure relates to modules for a frunk of vehicles.

BACKGROUND ART

A front trunk or "frunk" is an enclosed storage compartment usually at the front of a vehicle. Traditionally vehicles of rear-engine rear-wheel-drive (RR) designs have such a frunk space. Also, electric vehicles (EV) have freed up this space, which had been occupied by a conventional internal combustion engine in the front-engine, front-wheel-drive (FF) designs.

A frunk can provide a secure and separate storage area for luggage, tools, daily goods, and other items. Therefore, the frunk is becoming an important consideration for car users who transport such items frequently or who need ample storage capacity. Better configurations of such frunk spaces offer more, more convenient, and practical utility options.

SUMMARY OF THE INVENTION

One general aspect of the present disclosure includes a module for a frunk of a vehicle, which is expandable or unfoldable toward an outside of the vehicle when in use.

In some embodiment, the module may be a front hood itself of the vehicle. In some embodiment, the module may be a part of the front hood. In some embodiment, the front hood may be a part of the module, or the module may include the front hood. In these meanings or if the module is formed separately from the front hood, the term "module" for a frunk", "frunk module", or simply "module" will be interchangeably used with the term "front hood" in the present application.

In some embodiment, the front hood may be configured to be expanded or unfolded toward a front side of the vehicle.

The front hood may be front-hinged front hood. The front hood may rotate by more than 90 degrees, for example to a flat position, such that the inner surface of the front hood can face upwards. At the "open" position, the inner surface of the front hood may be used as a top plate or board, a table, or the like.

In some embodiments, the module may include a front grill of the vehicle, in addition to the front hood. The front hood may be rotatably or hingeably connected to the front grill. The front grill may be rotatably or hingeably connected to the main body of the vehicle.

In some embodiments, a container, a storage member, a storage box or the like (hereinafter referred to "storage member") may be attached to an inner surface of the front hood. The storage member may be fixed to the inner surface of the front hood. The storage member may be detachably attached to the inner surface of the front hood. The storage member may be slidably attached to the inner surface of the front hood. The storage member may be pulled by a user to a side, a front side or a left or right lateral side, to allow the user to access the inner volume of the storage member. The storage member may be completely detached from the inner surface of the front hood. For example, the storage member may be taken from the vehicle to be carried by a user. The storage member may be considered as the module that is attached to the inner surface of the vehicle. The storage member and the module together as a unit may be considered as the module.

The front volume of the vehicle may have a recess to receive the storage member when the front hood is closed. The recess may be formed to conform the outer shape of the storage member.

The vehicle may provide both a storage member attached to the inner surface of the front hood and a frunk space. Such a frunk space may be accessed when the front hood is opened.

In some embodiment, the module may be configured to be expanded or unfolded toward a lateral side of the vehicle. The front hood may have a left part and a right part which are configured to open to the left side and the right side of the vehicle, respectively.

The module may be the left or right part of the front hood that rotatably or hingeably opens to the corresponding lateral side. The aforementioned slidable storage member may be considered as a module that expands to a lateral side of the vehicle.

In some embodiments, the module may be configured as a member separate from the front hood of the vehicle. The module may be stored in the frunk of the vehicle when it is not in use or during driving. For use, the frunk is opened and the module may be expanded or unfolded from the frunk.

The front hood may be a rear-hinged front hood. The module may be expanded or unfolded towards the front side of the vehicle.

The module may be a folding table or the like, which is composed of multiple boards or plates connected. Such a folding table may be completely or partially unfolded to form a table outside the vehicle and provide a substantially flat and/or continuous surface.

Each of the multiple boards of the folding table may be connected to a neighboring board by hinges or any rotating mechanism. The folding table may have two boards thar are foldably and unfoldably connected. The folding table may have three or more boards, any two neighboring boards of which are foldably and unfoldably connected.

Each of the multiple boards of the folding table may be connected to a neighboring board by a sliding mechanism. It allows each board to slide from a neighboring board. Thus, the entire module may be extended to form a table outside the vehicle and provide a substantially flat and/or continuous surface. An end of the module or an edge of the first board at one end of the module may be attached, arranged or fixed to the vehicle. The other end of the module or another edge of the last board at the other end of the module may be pulled to extend or unfold the module.

Examples of the mechanism of the expanding and the unfolding of the module are not limited to a hinge mechanism and a sliding mechanism and include other mechanisms such as linkage mechanisms, and a combination of multiple mechanisms.

In some embodiments, the movement of the module may be manually controlled by the user. In some embodiments, the movement of the module may be automatically controlled. In some embodiments, the module may have a control unit to control the expanding or unfolding of the module. The control unit may have a servomotor to move the module. Thus the movement of the module may be controlled by the servomotor. Such an automatic control may include a sequence of: upon an order or input to open or unlock the front hood by a user, lifting the front hood and causing the module to move, expand, extend, or unfolding outside the vehicle, and a sequencer of: upon an order or input to close the front hood by a user, moving, shrinking, shortening or folding inside the vehicle and descending the front hood.

In some embodiments, the module may have a leg or multiple legs to support the module when the module is expanded or unfolded outside the vehicle. An extended module forms a cantilever beam or overhanging structure, and thus might not have enough rigidity by itself or onto which to place some items. A leg may stand on the ground to support the lower surface of the module when the module is extended or the surface facing the ground. Thereby, the module may provide the user with a surface outside the vehicle to be used in a safe manner.

In some embodiments, the module may include a leg or multiple legs. The leg may be rotatably or pivotably attached to the module. The leg may be stored inside the module or the front hood and unfolded when in use. In some embodiments, the module may have a leg holder to receive an externally provided leg at an end thereof.

In some embodiments, the legs may be extendable to adjust the length of the leg. The ground around the vehicle may not be even or horizontal. Thus, the height of the module at the leg position from the ground may vary depending on the situation. Extendable legs can adjust such height variations to provide the user with a rigid and safe flat surface for use.

Such a surface will create a variety of new usages, activities and lifestyles made possible around a car. It can be used as a desk, for eating on, placing things on while tailgating, camping, having a picnic or the like. Users may lay or rest on it. Padding mats or accessories may be arranged on it. The surface may be used for the user's pets. For example, a dog bed or crate may be placed on it. The user may lie underneath the expended module as a shelter from rain or for sleeping.

In some embodiments, electric power may be provided to the frunk module. A power source may be attached to the frunk module. The frunk module may be powered from an external power source when it is connected to the frunk module by a retractable cable and the like. Electric devices or apparatus may be included or attached to the frunk module such as a speaker to play music, a barbecue grill apparatus and the like.

The above usages are merely a part of examples. Other usages should also be possible. Such a frunk module will create much more new usages and open up new lifestyles.

BRIEF DESCRIPTION OF THE DRAWINGS

Some embodiments and examples of the present disclosure will now be discussed in detail by referring to the following figures. The embodiments and examples, with reference to the accompanying drawings, are given as examples only, and they should not be interpreted as being limiting.

EXAMPLE 1

Figure 1:
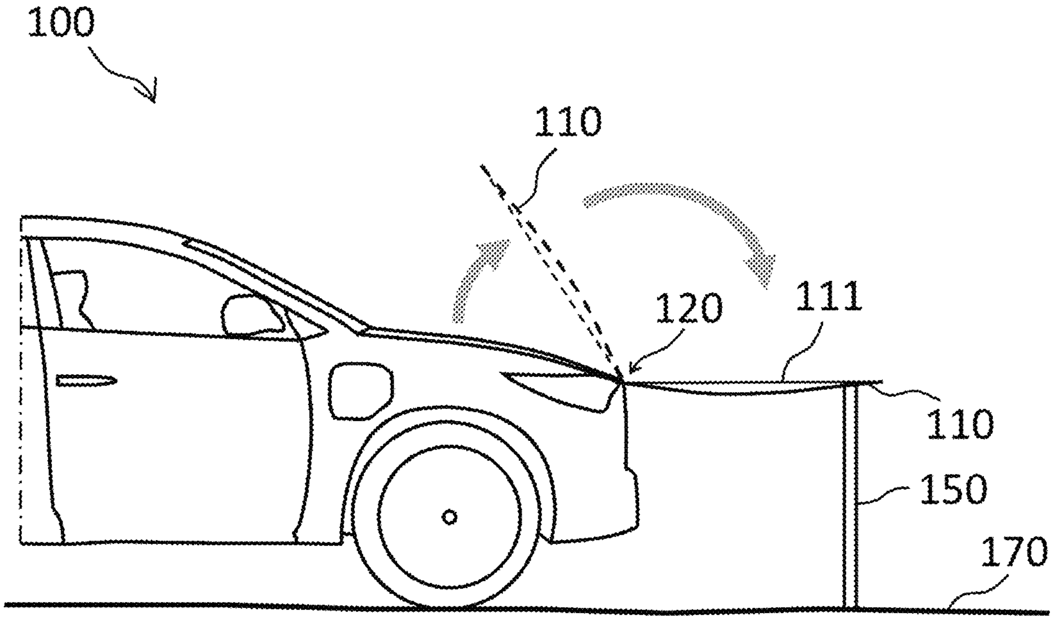
FIG. 1 shows a vehicle having a frunk module according to an example.

FIG. 1 shows a vehicle 100 having a front hood or a frunk module 110 according to an example. The front hood 110 is a front-hinged front hood that is rotatably connected to the vehicle 100 by a hinge 120. The front hood 110 can be opened and rotate in the direction of the front side of the vehicle 100 as shown with arrows illustrated in FIG. 1.

The front hood 110 has a table plate 111 on the inner surface of the front hood 110. When the front hood 110 is completely open or at the open position, the table plate 111 faces upwards or in the vertical direction.

The front hood 110 can be supported by a leg 150. The length of the leg 150 is extendable so that the length of the leg 150 is adjusted to the height of the front hood 110 from the ground surface 170. This secures the table plate 111 to be horizontal and to be rigid enough for the user to put some items on the table plate 111 or use the table plate 111 for activities outside and around the vehicle 100.

EXAMPLE 2

Figure 2:
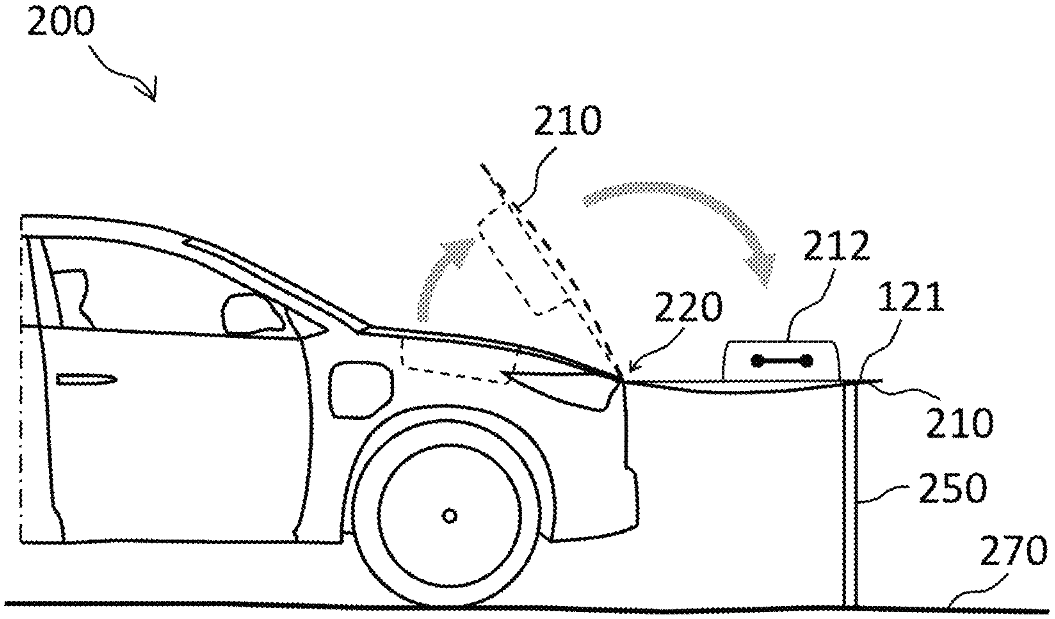
FIG. 2 shows a vehicle having a frunk module according to an example.

A variety of utilities are possible for the inner surface of the front hood. FIG. 2 shows a vehicle 200 having a front hood or a frunk module 210 according to an example. The front hood 210 is a front-hinged front hood that is rotatably connected to the vehicle 200 by a hinge 220. The front hood 210 can be opened and rotate in the direction of the front side of the vehicle. The front hood 210 has a table plate 211. When the front hood 210 is completely open or at the open position, the table plate 211 faces upwards or in the vertical direction.

The front hood 210 can be supported by a leg 250. The length of the leg 250 is extendable so that the length of the leg 250 is adjusted to the height of the front hood 210 from the ground surface 270.

In this Example, a container or a storage member 212 is attached to the table plate 211 or the inner surface of the front hood 210. The storage member 212 in FIG. 2 can be pulled out to the lateral side by a slide mechanism. The storage member 212 may be pulled out manually by the user. Alternatively, the storage member 212 may move by a servomotor not shown in the figure. The storage member 212 may be pulled out when the front hood 210 is completely open. But the storage member 212 may also be configured to be pulled out when the front hood 210 is half open, or when the inner surface of the front hood 210 does not face upwards. The storage member 212 may be accommodated in the frunk or in the front volume of the vehicle when the front hood 210 is closed. The front hood 210 can be opened and rotate in the direction of the front side of the vehicle 200 as shown with arrows illustrated in FIG. 2.

EXAMPLE 3

Figure 3:
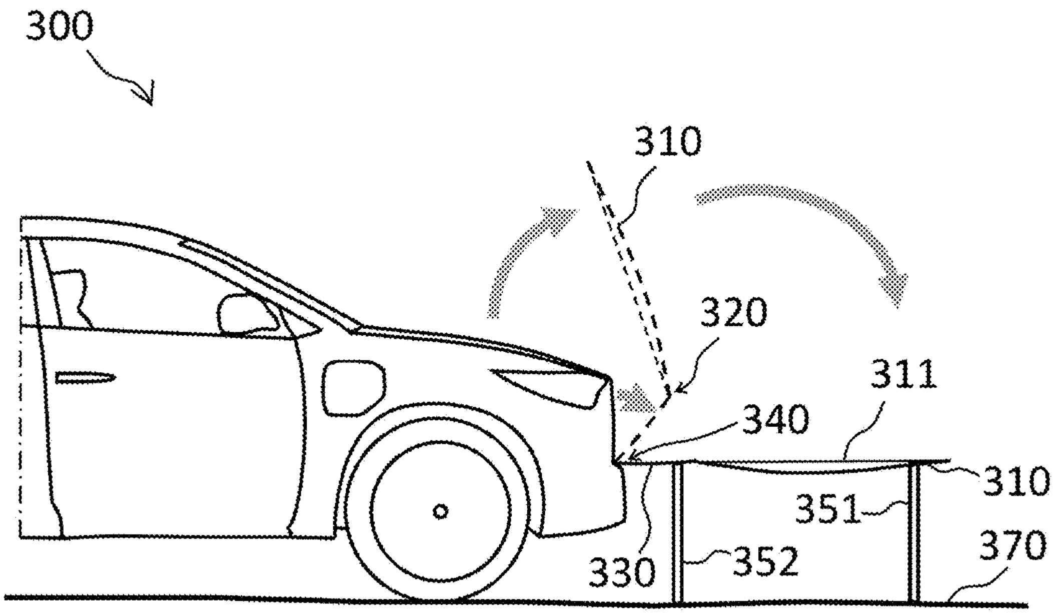
FIG. 3 shows a vehicle having a frunk module according to an example.

FIG. 3 shows a vehicle 300 having a front hood 310 and a front grill 330 as a frunk module according to an example. The front hood 310 is a front-hinged front hood that is rotatably connected to the front grill 330 by a hinge 320. The front grill 330 is rotatably connected to the vehicle main body by a hinge 340. The front hood 310 and the front grill 330 can be opened and rotate in the direction of the front side of the vehicle. When both the front hood 310 and the front grill 330 are completely open or at the open position, the inner surfaces of the front hood 310 and the front grill 330 form a continuous table plate 311.

In FIG. 3, the front hood 310 and the front grill 330 are supported by a leg 351 and a leg 352, respectively. The length of the legs 351 and 352 are extendable so that the length of the legs 351 and 352 is adjusted to the height of the front hood 310 and the front grill 330 from the ground surface 370, respectively. This secures the entire table plate 311 which are formed by two mechanical parts to be horizontal and to be rigid enough for the user to put some items on the large surface of the table plate 311 or use the table plate 311 for activities outside and around the vehicle 300. The front hood 310 and the front grill 330 can be opened and rotate in the direction of the front side of the vehicle 300 as shown with arrows illustrated in FIG. 3.

EXAMPLE 4

Figure 4:
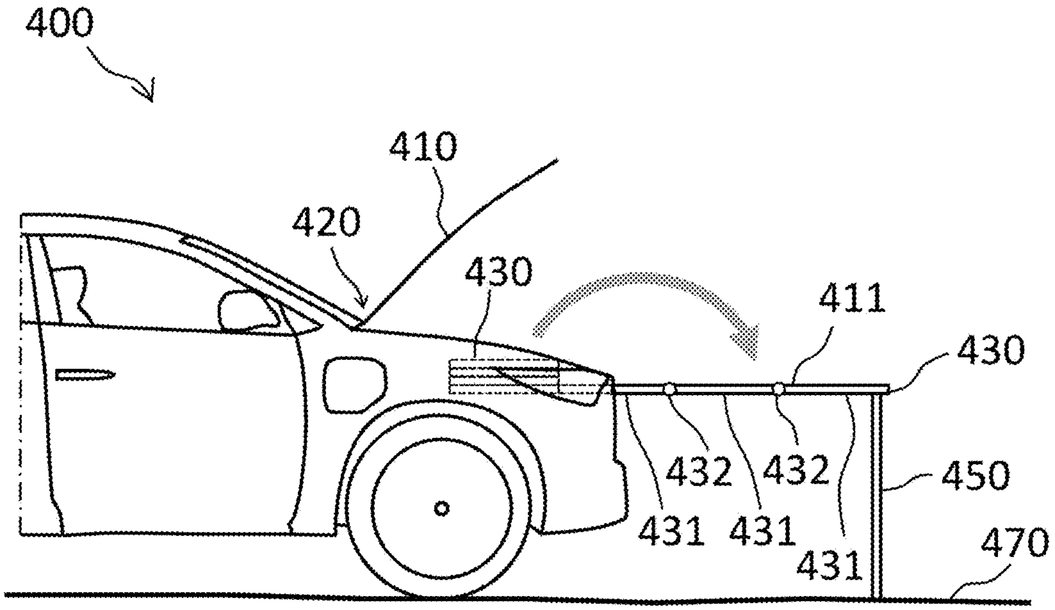
FIG. 4 shows a vehicle having a frunk module according to an example.

FIG. 4 shows a vehicle 400 having a front hood 410 and a frunk module 430 according to an example. The frunk module 430 may be configured as a separate member from the front hood 410 of the vehicle 400. The front hood 410 is a rear-hinged front hood that is rotatably connected to the vehicle 400 by a hinge 420.

The frunk module 430 shown in FIG. 4 has a configuration of a folding table composed of multiple plates 431 that are rotatably connected by hinges 432. The frunk module 430 is folded and stored in the frunk space when not in use. When the front hood 410 is opened, the frunk module 430 is expanded or unfolded outside of the vehicle towards the front direction thereof as shown with an arrow illustrated in FIG. 4. When the frunk module 430 is completely open or at the open position, the top surface of the unfolded frunk module 430 forms a continuous table plate 411.

In FIG. 4, the frunk module 430 is supported by a leg 450. The length of the leg 450 is extendable so that the length of the leg 450 is adjusted to the height of the frunk module 410 from the ground surface 470. The leg 450 is foldable to the frunk module 430 when not in use. The frunk module 430 may comprise a leg holder, not shown in the figure, to hold one end of a leg 450 that supports the module 430 when the module 430 is expanded or unfolded towards the outside the vehicle 400. Though not shown in the figure, each plate 431 may be supported by a corresponding leg. This secures the entire table plate 411 which are formed by multiple mechanical parts to be horizontal and to be rigid enough for the user to put some items on the large surface of the table plate 411 or use the table plate 411 for activities outside and around the vehicle 400. The present disclosure also provides the following embodiments:

A001. A module for a frunk of a vehicle, the module being expandable or unfoldable toward an outside of the vehicle when in use.

A002. The module of A001 or any other Embodiment, the module being expandable or unfoldable toward a front side of the vehicle.

A003. The module of A001 or any other Embodiment, the module being expandable or unfoldable toward a lateral side of the vehicle.

A011. The module of A001 or any other Embodiment, the module being configured to be a part of a front hood of the vehicle or to include a front hood of the vehicle.

A012. The module of A011 or any other Embodiment, wherein the front hood is a front-hinged front hood.

A013. The module of A012 or any other Embodiment, wherein the front hood is configured to open in such a way that an inner/lower surface of the front-hood faces upwards when in use, or that an inner/lower surface of the front hood is used as a usage surface when in use.

A014. The module of any one of A011 to A013 or any other Embodiment, the module being configured to further include a front grill of the vehicle, wherein the front hood is rotatably connected to the front grill, and the front grill is rotatably connected to a main body of the vehicle.

A015. The module of A014 or any other Embodiment, wherein the front grill is configured to open in such a way that an inner surface of the front grill faces upwards when in use, or that an inner surface of the front grill is used as a usage surface when in use.

A016. The module of any one of A012 to A015 or any other Embodiment, comprising a container (storage box) on an inner surface of the front hood, the container being configured to expand to a lateral side of the vehicle by a sliding mechanism.

A021. The module of A001 or any other Embodiment, the module being configured:

as a separate member from a front hood of the vehicle, to be stored in the frunk of the vehicle, when not in use, and to be expanded or unfolded from the frunk of the vehicle when the frunk is open.

A022. The module of A021 or any other Embodiment, wherein the module has a folding structure that allows the module to be folded to be stored in the frunk and to be unfolded towards the outside of the vehicle.

A023. The module of A021 or any other Embodiment, wherein the module has a slide mechanism that allows the module to be extended towards the outside of the vehicle.

A024. The module of A023 or any other Embodiment, wherein an end of the module is arranged/fixed in the frunk.

A031. The module of any one of A001 to A023 or any other Embodiment, wherein the expanding or unfolding of the module is mechanically controlled by using a servomotor.

A041. The module of any one of A001 to A031 or any other Embodiment, further comprising a leg to support the module when the module is expanded or unfolded towards the outside the vehicle.

A042. The module of A041 or any other Embodiment, wherein the leg is foldable to the module when not in use.

A043. The module of any one of A001 or to A031 or any other Embodiment, further comprising a leg holder to hold one end of a leg that supports the module when the module is expanded or unfolded towards the outside the vehicle.

A045. The module of any one of A041 to A043 or any other Embodiment, wherein the leg is extendable to adjust the length of the leg.

B001. A vehicle comprising the module of any one of A001 to A045 or any other Embodiment.

Terms and phrases used in this application, and variations thereof, especially in the appended claims, unless otherwise expressly stated, should be construed as being open-ended rather than being closed. As examples of the foregoing, the term 'including' should be understood to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes, but is not limited to;' the term 'example' is used to provide exemplary instances of the item in discussion, not an exhaustive or limiting list thereof.

A group of items linked with the conjunction 'and' should not be read as requiring that each and every one of these items be present in the grouping, but rather should be understood as 'and/or' unless expressly stated otherwise.

Similarly, a group of items linked with the conjunction 'or' should not be understood as requiring mutual exclusivity among that group, but rather should be understood as 'and/or' unless expressly stated otherwise.

With respect to the use of substantially any plural or singular term herein in the English language, those skilled in the art can understand the plural and the singular as appropriate according to context and the use. The various singular and plural permutations may be expressly set forth herein for the sake of clarity. The indefinite article "a" or "an" does not exclude a plurality.

Any of the embodiments or any of the aspects disclosed herein is independently combinable, in part or in whole, with other embodiments described herein in any way, e.g., one, two, or three or more embodiments may be combinable in whole or in part. Furthermore, any of the features of any of the embodiments or any of the aspects disclosed herein is applicable to any of the other embodiments and aspects, or may be made optional for other embodiments or aspects.

While preferred embodiments of the present invention have been shown and described herein, it will be obvious to those skilled in the art that such embodiments are provided by way of example only. It is not intended that the invention be limited to the specific examples provided within the specification. While the invention has been described with reference to the aforementioned specification, the descriptions and illustrations of the embodiments and examples herein are not meant to be construed in a limiting sense. Numerous variations, changes, and substitutions can be conceived by those skilled in the art without departing from the concept of the invention. Furthermore, it shall be understood that no aspects of the invention are limited to the specific depictions, configurations, or relative proportions set forth herein which depend upon a variety of conditions and variables. It should be understood that various alternatives to the embodiments of the invention described herein may be employed in practicing the invention. It is therefore to be understood that the invention shall also cover any such alternatives, modifications, variations or equivalents. It is intended that the following claims define the scope of the invention and that methods and structures within the scope of these claims and their equivalents be covered thereby.

What is claimed is:

1. A module for a frunk of a vehicle, the module comprising:
- a front hood of the vehicle, the front hood being a front-hinged front hood rotatably connected to the vehicle by a hinge;
- a table plate on an inner surface of the front hood; and
- a leg configured to support the front hood when the front hood is in an open position,
- wherein the front hood is configured to rotate toward a front side of the vehicle by more than 90 degrees to the open position in which the table plate faces upward.

2. The module of claim 1, comprising a container attached to the table plate or on an inner surface of the front hood, the container being configured to expand to a lateral side of the vehicle by a sliding mechanism.

3. The module of claim 2, wherein the vehicle has a recess that receives the container when the front hood is closed, and wherein the recess conforms to an outer shape of the container.

4. The module of claim 1, wherein rotation of the front hood toward the front side of the vehicle is controlled by a servomotor.

5. The module of claim 1, wherein the leg is foldable to the module when not in use.

6. The module of claim 1, wherein the leg is extendable to adjust a length of the leg.

7. A vehicle comprising the module of claim 1.

8. The module of claim 1, wherein the leg is extendable to adjust a height of the front hood from a ground surface so that the table plate is horizontal.

9. The module of claim 1, wherein the leg is foldable to the front hood when the front hood is not in the open position.

10. A module for a frunk of a vehicle, the module comprising:
- a front hood of the vehicle;
- a front grill of the vehicle;
- a first hinge;
- a second hinge;
- a first leg; and
- a second leg,
- wherein the front hood is rotatably connected to the front grill by the first hinge,
- wherein the front grill is rotatably connected to a main body of the vehicle by the second hinge,
- wherein the front hood and the front grill are configured to rotate toward a front side of the vehicle to an open position in which inner surfaces of the front hood and the front grill form a continuous table plate,
- wherein the first leg supports the front hood when the front hood and the front grill are in the open position,
- wherein the second leg supports the front grill when the front hood and the front grill are in the open position, and
- wherein each of the first leg and the second leg is extendable to adjust a length thereof.

11. A vehicle comprising the module of claim 10.

* * * * *